US009355089B1

(12) United States Patent  
Nagarajan et al.

(10) Patent No.: US 9,355,089 B1  
(45) Date of Patent: May 31, 2016

(54) INTENTION DETECTION IN DOMAIN-SPECIFIC INFORMATION

(71) Applicants: International Business Machines Corporation, Armonk, NY (US); Baylor College of Medicine, Houston, TX (US); The Board of Regents, The University of Texas System, Austin, TX (US)

(72) Inventors: Meenakshi Nagarajan, San Jose, CA (US); William Scott Spangler, San Martin, CA (US); Benjamin J. Bachman, Houston, TX (US); Lawrence A. Donehower, Houston, TX (US); Olivier Lichtarge, Houston, TX (US); Sam J. Regenbogen, Houston, TX (US); Angela D. Wilkins, Houston, TX (US); Curtis R. Pickering, Houston, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 14/564,068

(22) Filed: Dec. 8, 2014

(51) Int. Cl.
    *G06F 17/27* (2006.01)
    *G06F 17/28* (2006.01)

(52) U.S. Cl.
    CPC .......... *G06F 17/274* (2013.01); *G06F 17/2715* (2013.01); *G06F 17/2775* (2013.01); *G06F 17/28* (2013.01)

(58) Field of Classification Search
    CPC .............. G06F 17/274; G06F 17/2775; G06F 17/2715; G06F 17/28
    USPC .......... 704/4, 7, 222, 236, 237, 243, 245, 251
    See application file for complete search history.

(56) References Cited

U.S. PATENT DOCUMENTS

| 5,519,608 A | 5/1996 | Kupiec |
| 6,374,209 B1 * | 4/2002 | Yoshimi .............. G06F 17/2745 704/9 |

(Continued)

FOREIGN PATENT DOCUMENTS

| EP | 2515242 A2 | 10/2012 |
| WO | 2012162405 A1 | 11/2012 |
| WO | 2013019532 A1 | 2/2013 |

OTHER PUBLICATIONS

Whitelaw et al; "Systemic functional features in stylistic text classification", Ms., Sydney Language Technology Research Group, University of Sydney, Sydney, Australia (2004).

(Continued)

*Primary Examiner* — Marcellus Augustin  
(74) *Attorney, Agent, or Firm* — Garg Law Firm, PLLC; Rakesh Garg; William J. Stock (57) ABSTRACT

A new information in a language and relating to a subject matter domain is parsed into a constituent set of complete grammatical constructs. In a subset of the complete grammatical constructs, a set of linguistic styles of the language is identified according to a subset of a set of word-style associations related to the language and independent of the subject matter domain. A first weight is assigned to a first linguistic style and a second weight to a second linguistic style from the set of linguistic styles. A first intention information is mapped to the first style using a first style-intention rule, and a second intention information to the second style using a second style-intention rule. A complete grammatical construct in the subset is tagged with the first intention information responsive to a weight associated with the first intention information exceeding an intention selection threshold.

19 Claims, 6 Drawing Sheets

(56) References Cited

U.S. PATENT DOCUMENTS

| | | | |
|---|---|---|---|
| 7,610,279 B2* | 10/2009 | Budzik | G06F 17/30389 |
| 8,380,492 B2 | 2/2013 | Xu et al. | |
| 2003/0004716 A1 | 1/2003 | Haigh et al. | |
| 2009/0198488 A1* | 8/2009 | Vigen | G06F 17/2785 704/9 |
| 2009/0313019 A1* | 12/2009 | Kato | G10L 17/26 704/254 |
| 2011/0270604 A1 | 11/2011 | Qi et al. | |
| 2012/0271788 A1 | 10/2012 | Fang et al. | |
| 2013/0013539 A1 | 1/2013 | Chenthamarakshan et al. | |
| 2014/0200878 A1* | 7/2014 | Mylonakis | G06F 17/2854 704/4 |
| 2015/0309981 A1* | 10/2015 | Brav | G06F 17/3053 715/254 |

OTHER PUBLICATIONS

Zagibalov; "Unsupervised and knowledge-poor approaches to sentiment analysis", PhD diss., University of Sussex, 2010.

Langner et al; "Generating time-constrained audio presentations of structured information", in Interspeech 2006.

* cited by examiner

INTENTION DETECTION IN DOMAIN-SPECIFIC INFORMATION

GOVERNMENT RIGHTS

This invention was made with Government support under DARPA contract number W911QX-12-C-0044. THE GOVERNMENT HAS CERTAIN RIGHTS IN THIS INVENTION.

TECHNICAL FIELD

The present invention relates generally to a method, system, and computer program product for automated enhancement in understanding complex information. More particularly, the present invention relates to a method, system, and computer program product for intention detection in domain-specific information.

BACKGROUND

A corpus (plural: corpora) is data, or a collection of data, used in linguistics and language processing. A corpus generally comprises large volume of data, usually text, stored electronically. As an example, one or more scientific articles published in a publication can form a corpus.

Natural language processing (NLP) is a technique that facilitates exchange of information between humans and data processing systems. For example, one branch of NLP pertains to answering questions about a subject matter based on information available about the subject matter domain.

Domain-specific information comes in a variety of forms and sizes. Consider the example of the information presented in a scientific article in a publication. Such information can range from being a few sentences long to a few pages long.

Additionally, different domain-specific information can follow different arrangement or organization of the information presented therein. Using the example of the scientific article again, some articles follow an organization commonly followed by other articles presented in the same scientific subject matter domain, whereas other articles adopt an organization that is a departure from a commonly used organization in that scientific domain.

Furthermore, the subject matter of the information can be conveyed in different ways. For example, the scientific article may be drafted in a way such that the information in the article is understandable by persons not trained in the particular scientific domain. Alternatively, the information in the article may be presented in such a way that makes it difficult for untrained persons to understand the contents of the article.

SUMMARY

The illustrative embodiments provide a method, system, and computer program product for intention detection in domain-specific information. An embodiment includes a method for intention detection in information. The embodiment parses a new information into a constituent set of complete grammatical constructs, the new information being in a language and relating to a subject matter domain. The embodiment identifies, in a subset of the complete grammatical constructs, a set of linguistic styles of the language according to a subset of a set of word-style associations related to the language and independent of the subject matter domain. The embodiment assigns a first weight to a first linguistic style and a second weight to a second linguistic style, the set of linguistic styles including the first linguistic style and the second linguistic style. The embodiment maps a first intention information to the first style using a first style-intention rule, and a second intention information to the second style using a second style-intention rule. The embodiment tags a complete grammatical construct in the subset with the first intention information responsive to a weight associated with the first intention information exceeding an intention selection threshold.

Another embodiment includes a computer usable program product comprising a computer readable storage device including computer usable code for intention detection in information. The embodiment further includes computer usable code for parsing a new information into a constituent set of complete grammatical constructs, the new information being in a language and relating to a subject matter domain. The embodiment further includes computer usable code for identifying, in a subset of the complete grammatical constructs, a set of linguistic styles of the language according to a subset of a set of word-style associations related to the language and independent of the subject matter domain. The embodiment further includes computer usable code for assigning a first weight to a first linguistic style and a second weight to a second linguistic style, the set of linguistic styles including the first linguistic style and the second linguistic style. The embodiment further includes computer usable code for mapping a first intention information to the first style using a first style-intention rule, and a second intention information to the second style using a second style-intention rule. The embodiment further includes computer usable code for tagging a complete grammatical construct in the subset with the first intention information responsive to a weight associated with the first intention information exceeding an intention selection threshold.

Another embodiment includes a data processing system for intention detection in information. The embodiment further includes a storage device, wherein the storage device stores computer usable program code. The embodiment further includes a processor, wherein the processor executes the computer usable program code. The embodiment further includes computer usable code for parsing a new information into a constituent set of complete grammatical constructs, the new information being in a language and relating to a subject matter domain. The embodiment further includes computer usable code for identifying, in a subset of the complete grammatical constructs, a set of linguistic styles of the language according to a subset of a set of word-style associations related to the language and independent of the subject matter domain. The embodiment further includes computer usable code for assigning a first weight to a first linguistic style and a second weight to a second linguistic style, the set of linguistic styles including the first linguistic style and the second linguistic style. The embodiment further includes computer usable code for mapping a first intention information to the first style using a first style-intention rule, and a second intention information to the second style using a second style-intention rule. The embodiment further includes computer usable code for tagging a complete grammatical construct in the subset with the first intention information responsive to a weight associated with the first intention information exceeding an intention selection threshold.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that often, domain-specific information follows a structure that has been adopted in that domain for communicating similar information. For example, authors of scientific articles typically follow a structure by first presenting the problem statement and providing some background information. Next, the authors present the question or hypothesis they are considering, followed by the details of the methodology used and analyses conducted. Finally, the authors present results and conclude with additional discussions.

The illustrative embodiments recognize that such a structure of the information is not always provided with or apparent from the information. For example, when a structure is not expressly provided in an abstract of an article, identifying the intention of the authors behind the information in the article becomes a difficult problem to solve. For example, in the case of a scientific article, a consumer of the article may not be able to establish whether a particular sentence in the article comprises background information or a conclusion.

The illustrative embodiments recognize that tagging the sentences of the article with the intent behind those sentences can be useful to a consumer of the article. Generally, the illustrative embodiments recognize that given any domain-specific information in any language, tagging sentences or other complete grammatical constructs according to the given language, with intention information is useful for improving the usability of the information.

For example, a consumer of a scientific article may be an application to generate hypotheses. Such a consumer may find that information extracted from statements intending to cover a scientific method used by the author is potentially less useful for hypothesis generation as compared to the information extracted from the background or conclusions in the article. For example, the consumer may find that information from the background sentences can be more reliably used to chart state-of-the-art in a scientific area to which the article pertains.

The illustrative embodiments recognize that presently, determining the intention of the author from a given information is largely a human effort. To the extent a presently available system or method may be able to identify an intention in the information, such systems or methods are limited to finding exact intent-expressing phrases or lexical cues, such as 'it is the intention,' 'the result is,' 'we conclude,' 'using this background,' 'in summary,' and so on.

The illustrative embodiments recognize that presently available systems or methods are extremely limited and therefore unsuitable for determining the intention behind any given information in an automated manner. Consequently, presently, the given information or the complete grammatical constructs therein cannot be tagged with intention information to facilitate the consumption of the information.

The illustrative embodiments used to describe the invention generally address and solve the above-described problems and other problems related to intention detection in given information. The illustrative embodiments provide a method, system, and computer program product for intention detection in domain-specific information.

A sentence is one example of a complete grammatical construct in the English language. Other languages include constructs similar to a sentence, but are not necessarily limited to only a sentence-type construct. Other constructs that are grammatically correct and complete for conveying a thought in a given language are also contemplated within the scope of the term "complete grammatical construct" (as used in the illustrative embodiments. "Complete grammatical construct" is also interchangeably referred to herein as "grammatical construct" or "construct" unless expressly disambiguated proximate to where the term is used.

Tagging a complete grammatical construct is a manner of associating metadata with the complete grammatical construct. Particularly, tagging a complete grammatical construct with intention information comprises associating information about an intention of the complete grammatical construct with the complete grammatical construct.

Within the scope of the illustrative embodiments, "intention" of a complete grammatical construct comprises an intention of an author of the complete grammatical construct about how the information contained in the complete grammatical construct is to be used in reference to the remainder of the information, of which the complete grammatical construct is a part.

As an example, if a sentence in a scientific article is tagged with a "method" intention, the sentence is intended for use as a description of a method used to produce an analysis or conclusion in the article. As another example, if a sentence in a scientific article is tagged with a "background" intention, the sentence is intended for use as background material relied upon by the author of the article. As another example, if a sentence in a scientific article is tagged with a "conclusion" intention, the sentence is intended as a conclusion reached by the author of the article.

Many intentions are possible for the various complete grammatical constructs, in a given information, in a particular language, and pertaining to a given domain. An embodiment is configurable for use with information in any given language, including one or more complete grammatical constructs according to the language, and pertaining to any domain, to tag the complete grammatical constructs with any of the possible intentions recognized in that domain.

For a given language, and regardless of any domain-specific knowledge or information, an embodiment determines stylistic categories in the language that are indicative of intent or intentions. Stylistic categories (hereinafter "styles") of a language are forms of words or phrases in that language that indicate a role, a temporal aspect, a definiteness or tentativeness, a tense, a dependency, or an attribution of a concept or idea expressed therein.

For example, consider the following example in the English language and pertaining to life sciences domain —"These findings suggest that ERK2 may play a role in response to DNA damage via interaction with p53." The words "suggest" and "may" are tentative words, indicating a tentative styling of the sentence. Consider the following additional example in the English language and pertaining to life sciences domain —"Our previous study has shown leptomycin B (LMB) significantly inhibited proliferation of lung cancer cells." The words "previous" and the past-tense form of "inhibit" are tense words, styling the concept in the sentence to a time in the past.

The list of possible styling is dependent upon the language, and is too large or varied in most languages, including English, to cover exhaustively in this disclosure. The above non-exhaustive examples of styles are sufficient to guide one of ordinary skill in the art to determine other styles in a given language, and such other styles are contemplated within the scope of the illustrative embodiments.

An embodiment further uses domain-specific training information in a given language to learn a set of possible intentions in such information. For example, a collection of English scientific articles pertaining to life sciences usually has a background intention, a hypothesis or a question intention, a method intention, a result intention, and a discussion or interpretation intention.

Using the training information, an embodiment constructs a set of style-intention rules. A style-intention rule encodes a relationship between a style and an intention. For example, when a complete grammatical construct in the information has the background intention, the complete grammatical construct uses a past tense style. As another example, when a complete grammatical construct has the hypothesis intention, the complete grammatical construct uses a tentative style. These and other relationships between language-specific domain-independent styles, and language-specific domain-specific intentions. A style-intention rule encodes such relationships so that when the rule is applied to an actual non-training information, the rule can identify an intention based on the style in the information.

An embodiment further determines a structure followed by the training information. For example, if the training information comprises English scientific articles in the life-sciences domain, the embodiment learns that the training articles follow the structure—Background, followed by Question or Hypothesis, followed by Methods, followed by Results, and lastly Discussion/Interpretation.

In other words, the embodiment identifies sections of the training information where complete grammatical constructs having the background intention are concentrated, where complete grammatical constructs having the hypothesis intention are concentrated, and so on. Furthermore, the embodiment identifies an order in which the concentrations of the complete grammatical constructs with those intentions appear in the training information.

The embodiment encodes the structure learned from the training information. The encoding of the structure can be accomplished in any suitable manner so long as the encoded structure is usable to identify parts of the encoded structure in the non-training information. For example, in the simplest form, the encoded structure is an ordered list of intentions, indicating the order of sections where those intentions are most likely to be found in information that pertains to the language and domain of the training information.

An embodiment uses a lexicon of the given language to identify words and word-forms that are commonly used in the styles that were identified elsewhere. For example, using a lexicon for the English language, the embodiment determines that the word "may" is used in the tentative style whereas the word "shall" or "is" is used in a definitive style. In a similar manner, and using the given lexicon for the given language, the embodiment forms a set of word-style associations. A word-style association associates a word or a form of a word with a style.

An embodiment uses the set of style-intention rules, the encoded structure, and the set of word-style associations to determine the intentions in a given non-training information. Specifically, the embodiment parses the information into constituent set of complete grammatical constructs, such as sentences if the information is in English.

An embodiment further identifies the prevalence of one or more styles in a subset of complete grammatical constructs. For example, the embodiment identifies words in a complete grammatical construct and determines an associated style using a word-style association.

An embodiment uses the encoded structure to assign weights to an identified style. For example, if the complete grammatical construct being analyzed reveals a past tense style, and the complete grammatical construct is located in a section of the information, which according to the encoded structure should contain the background information, the embodiment assigns the past tense style a higher than a threshold weight. In contrast, if the complete grammatical construct being analyzed reveals a past tense style, and the complete grammatical construct is located in a section of the information, which according to the encoded structure should contain the method information, the embodiment assigns the past tense style a lower than a threshold weight. Of course, any number of weight thresholds can be defined to create any number of weight ranges, from which to assign weights in a similar manner within the scope of the illustrative embodiments.

An embodiment maps a weighted style to an intention using a style-intention rule. One embodiment selects only those styles for this mapping, whose weight exceeds a selection threshold. For example, if a complete grammatical construct has a tentative style with a weight of 80 (on a scale of 0-99) and has a definitive style with a weight of 45 on the same scale, the embodiment selects the tentative style by using a selection threshold of 50. Another embodiment selects both styles. Depending upon how and which styles are selected, the respective embodiments map the selected one or more styles to an intention according to a style-intention rule.

Note that the relationship between styles and intentions can be 1-1, 1-n, n-1, or n-m. Similarly, the relationship between words and styles can also be 1-1, 1-n, n-1, or n-m. Further note that any number of sections with their corresponding intentions can be represented in an encoded structure. A section can have one or more intentions, and an intention can be present in one or more sections of the structure.

Having mapped one or more selected styles to one or more intensions, an embodiment selects those intentions whose weights exceed an intention weight threshold. The weight of an intention corresponds to the weight of a style that is related to the intention based on a rule. Furthermore, the weight of the style can be modified, e.g., increased or decreased, based on other linguistic or domain-specific considerations encoded in a style-intention rule.

In one example embodiment, if the styles were selected based on a selection threshold, the further selection of intentions based on intention weight threshold is omitted. In another embodiment, if the styles were not selected based on a selection threshold, the selection of intentions based on intention weight threshold operates to narrow the choices of intentions of a complete grammatical construct. In another embodiment, if the styles were selected based on a selection threshold, the further selection of intentions based on intention weight threshold operates to further narrow the choices of intentions of a complete grammatical construct.

An embodiment associates a selected intention for tagging a complete grammatical construct that is processed in this manner. For example, if the highest weighted intention is selected as described above, the embodiment tags the complete grammatical construct whose analysis resulted in the determined intention, with the intention information (also referred to herein as intention metadata).

An embodiment outputs the information in an intention-tagged form. In other words, the complete grammatical constructs in the information are tagged with their corresponding intentions and the set of such tagged complete grammatical constructs is output from the embodiment.

A method of an embodiment described herein, when implemented to execute on a device or data processing system, comprises substantial advancement of the functionality of that device or data processing system in automated intention detection in information. For example, in order to detect an intention of a statement, the prior-art requires express intent-revealing phrases to exist in the given information. In contrast, an embodiment can detect an intention behind a sentence, automatically, even when no express intentions are revealed in the given information. Such manner of automated intention detection is unavailable in presently available devices or data processing systems. Thus, a substantial advancement of such devices or data processing systems by executing a method of an embodiment improves the usability of the information in an information consuming process.

The illustrative embodiments are described with respect to certain languages, domains, information, structures, sections, intentions, styles, words, lexicons, thresholds, weights, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
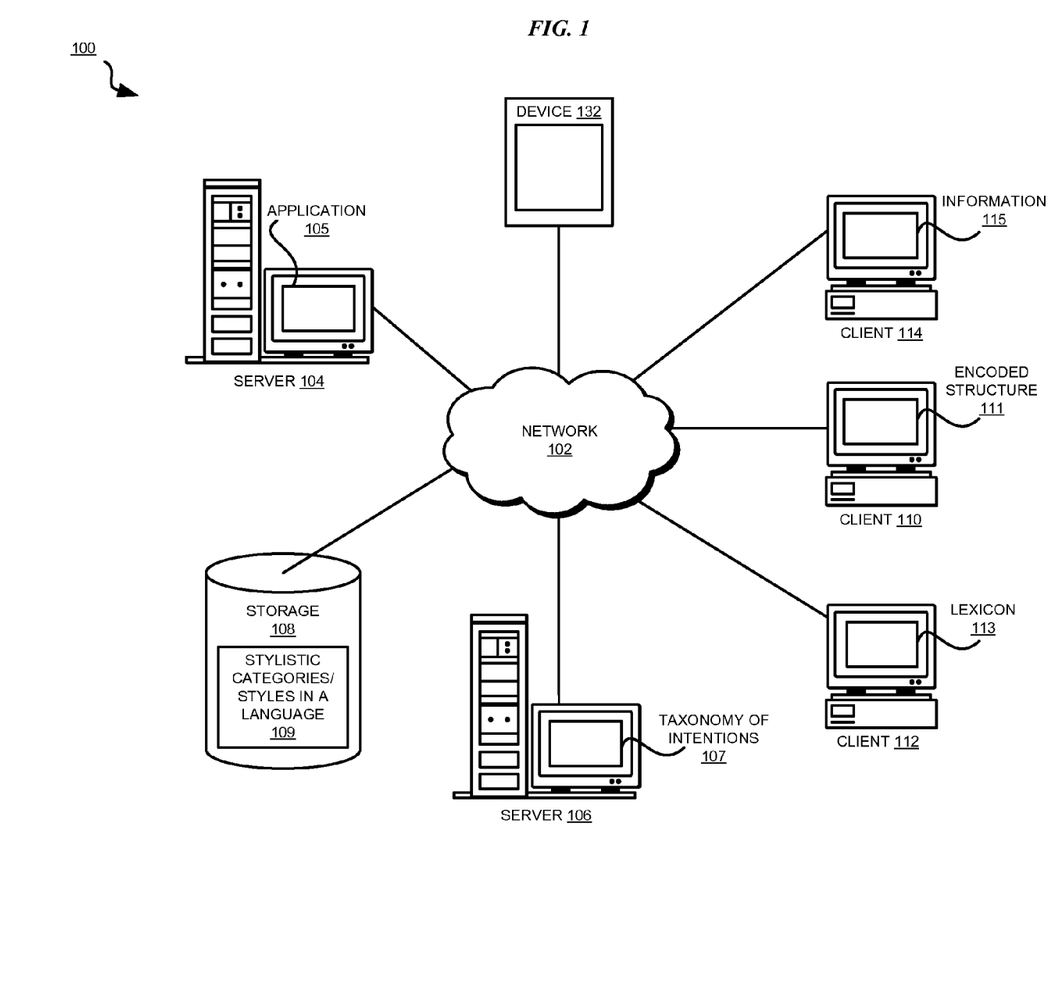
FIG. 1 depicts a block diagram of a network of data processing systems in which illustrative embodiments may be implemented.
Figure 2:
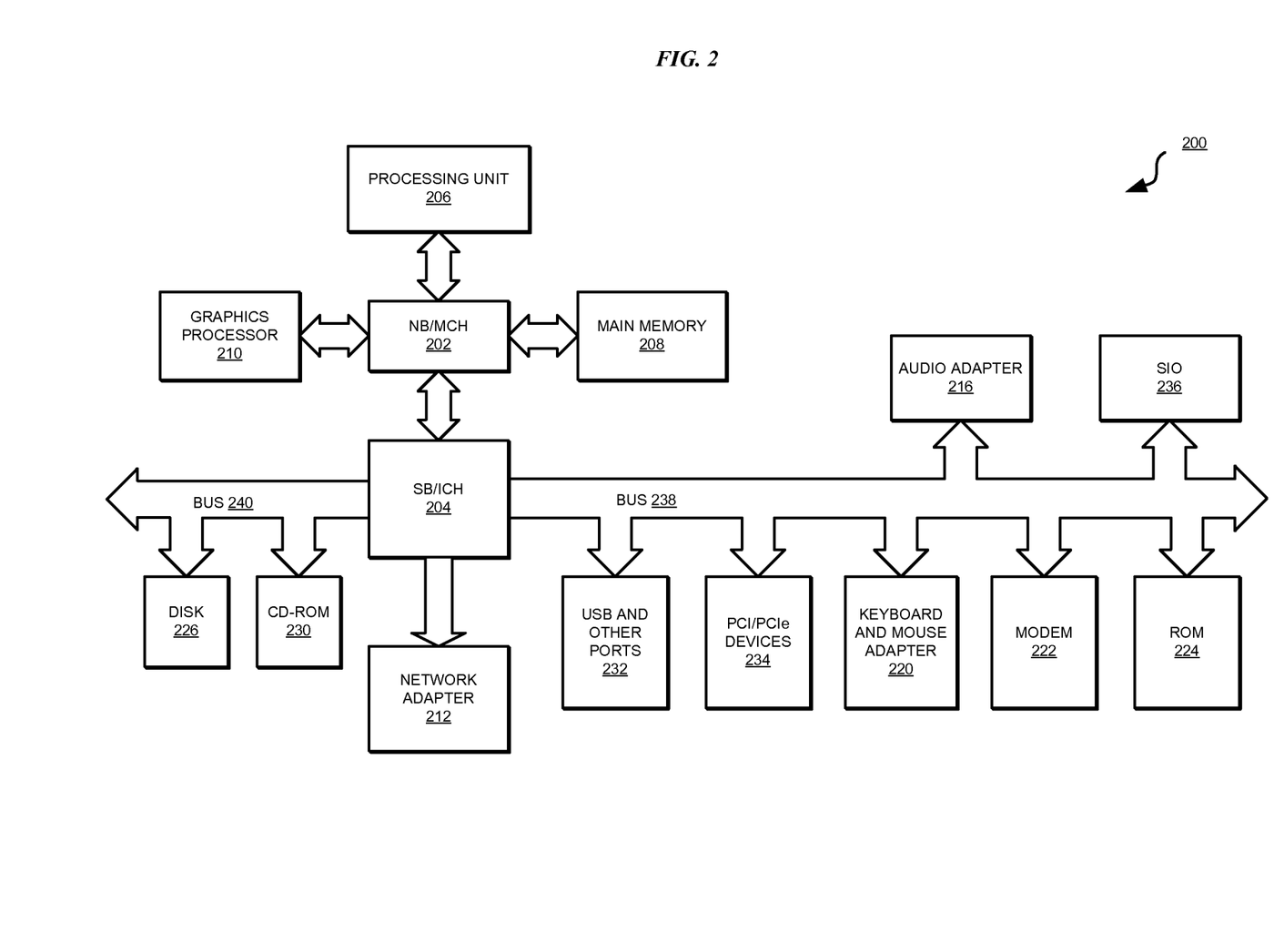
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Application 105 in server 104 implements one or more embodiments described herein. Stylistic categories 109 are extracted by application 105 as described elsewhere in this disclosure. Taxonomy of intentions is a collection of intentions identified by or supplied to application 105 as described elsewhere in this disclosure. Application 105 uses lexicon 113 as described elsewhere in this disclosure. Application 105 produces encoded structure 111 as described elsewhere in this disclosure. Information 115 can be training information for some embodiments and non-training actual information for other embodiments as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
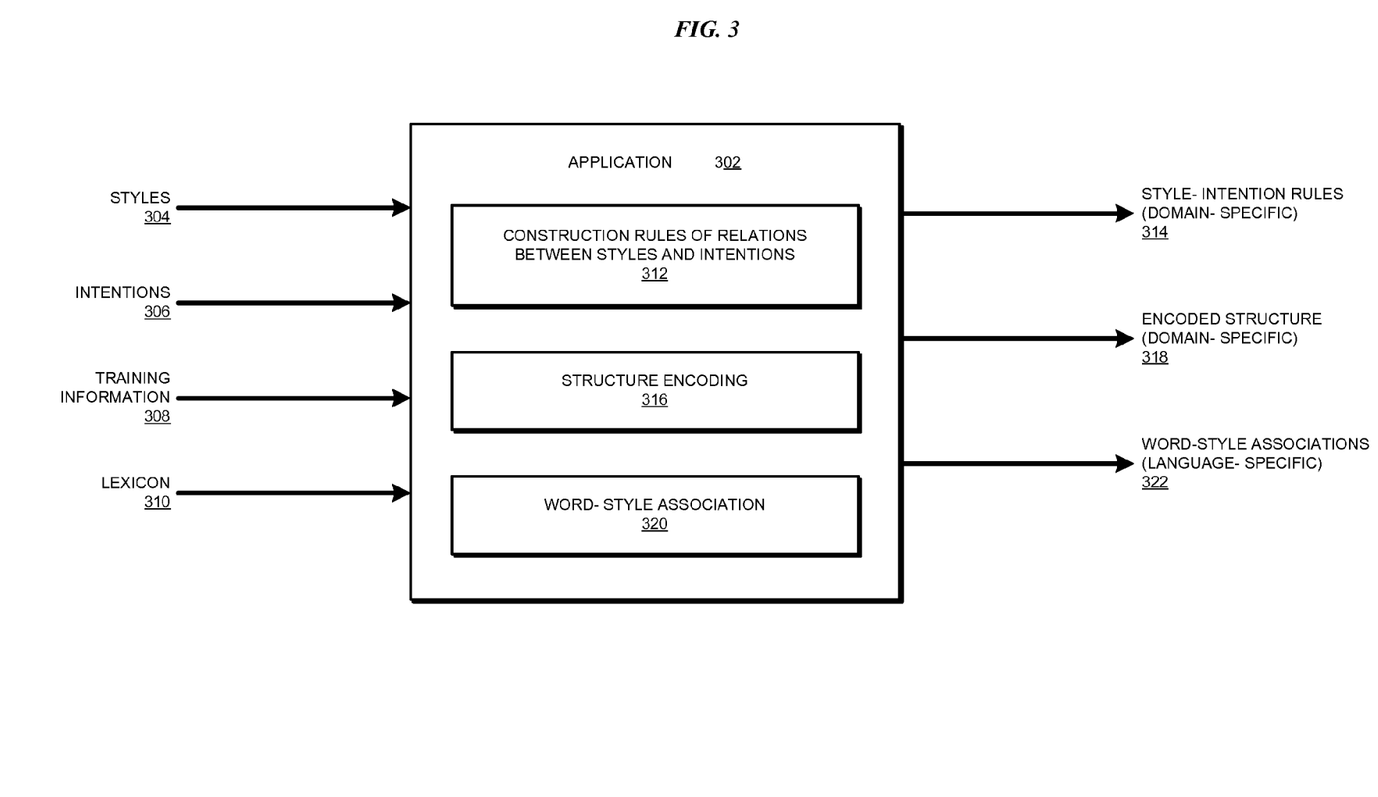
FIG. 3 depicts a block diagram of an example application for preparing for intention detection in domain-specific information in accordance with an illustrative embodiment.

With reference to FIG. 3, this figure depicts a block diagram of an example application for preparing for intention detection in domain-specific information in accordance with an illustrative embodiment. Application 302 can be implemented as application 105 in FIG. 1.

Application 302 receives a set of stylistic categories, or styles 304 of a given language as input. Styles 304 are an example of styles 109 in FIG. 1. For a given domain, application 302 also receives a set of intentions 306 found in the information pertaining to that domain in the given language. Set 306 of intentions comprises all or a part of taxonomy of intentions 107 in FIG. 1.

Training information 308 is an example of information 115 in FIG. 1. Training information 308 comprises samples of the types of domain-specific information in the given language in which application 302 has to be able to identify intentions. Application 302 receives one or more such samples of training information 308 as input.

Lexicon 310 is an example of lexicon 113 in FIG. 1. Lexicon 310 is a lexicon of the language of styles 304 and training information 308. Application 302 receives lexicon 310 as another input.

Using styles input 304 and intentions input 306, component 312 determines the relationships between one or more styles and one or more intentions, and constructs set 314 of style-intention rules. Set 314 of style-intention rules are stored in any suitable manner for later use with other non-training information, such as by application 402 in FIG. 4. For example, set 314 of style-intention rules can be stored in server 104 or storage 108 in FIG. 1.

Set 314 of style-intention rules is specific to the domain of intentions 306. In one embodiment, the relationships between styles and intentions are determined, verified, or both, using training information 308, and as such, set 314 of style-intention rules is specific to the domain of training information 308.

Component 316 identifies and encodes a structure present in training information 308. Component 316 outputs encoded structure 318. Encoded structure 318 is specific to the domain of the information in which component 316 identifies the structure. Encoded structure 318 is an example of encoded structure 111 in FIG. 1 and can be stored in any suitable manner for later use with other non-training information, such as by application 402 in FIG. 4. For example, encoded structure 318 can be stored in client 110, server 104, or storage 108 in FIG. 1.

Using lexicon 310 and styles 304, component forms a set of word-style associations 322. The word-style associations in set 322 are language-specific but not domain-specific. Set 322 of word-style associations are stored in any suitable manner for later use with other non-training information, such as by application 402 in FIG. 4. For example, set 322 of word-style associations can be stored in server 104, device 132, or storage 108 in FIG. 1.

Figure 4:
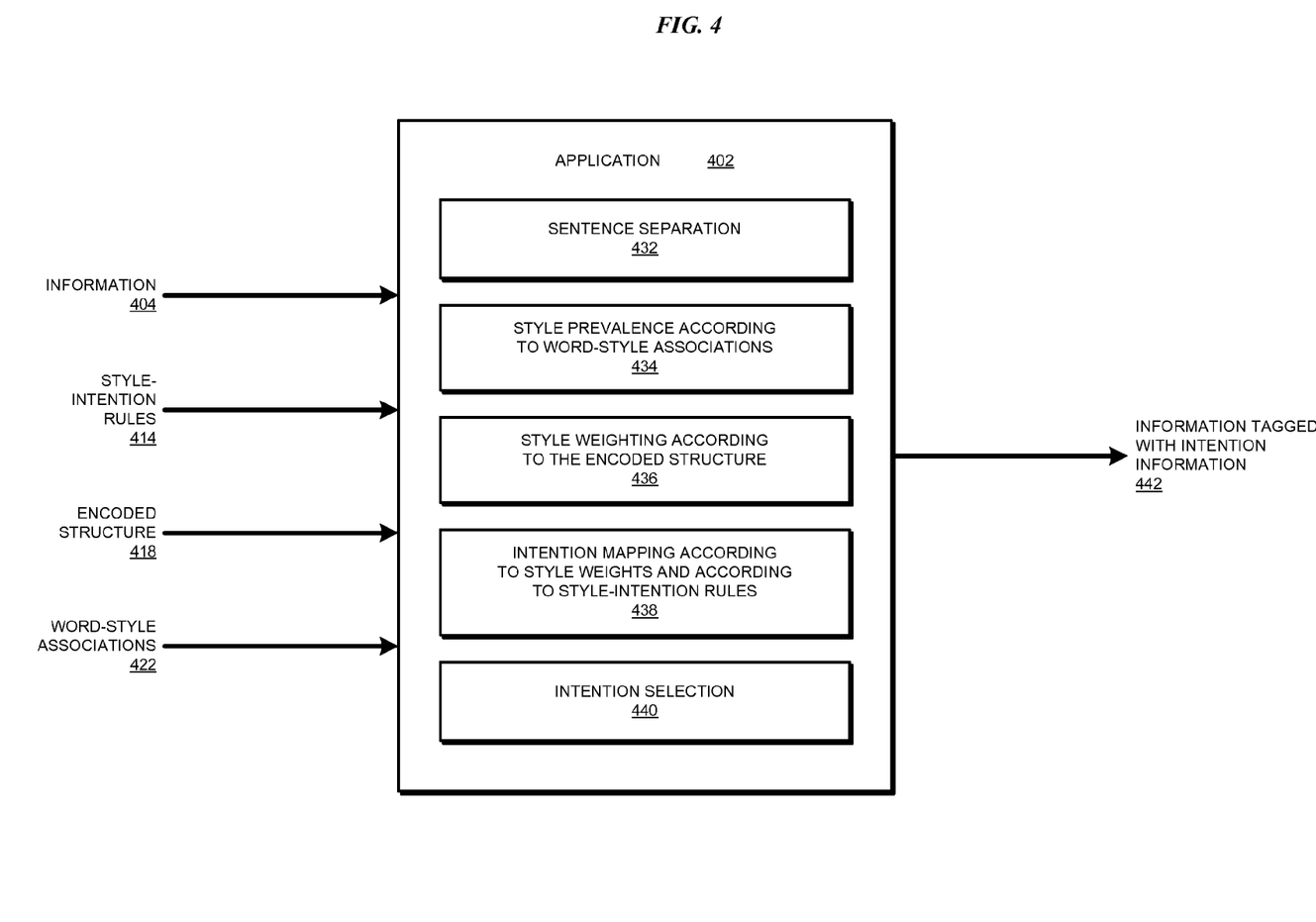
FIG. 4 depicts a block diagram of an example application for intention detection in domain-specific information in accordance with an illustrative embodiment.

With reference to FIG. 4, this figure depicts a block diagram of an example application for intention detection in domain-specific information in accordance with an illustrative embodiment. Application 302 can be implemented as application 105 in FIG. 1. In one embodiment, application 402 and application 302 of FIG. 3 can be combined into application 105 in FIG. 1. In another embodiment, application 302 and application 402 execute as different applications in the same or different data processing systems. For example, in one embodiment, application 302 and application 402 execute as different applications in server 104, as application 105 executes in server 104. In another embodiment, application 302 executes in server 104 in FIG. 1, and application 402 executes in server 106 or device 132 in FIG. 1.

Application 402 receives information 404 within which the intentions of one or more complete grammatical constructs are to be determined. Information 404 comprises non-training information, distinct from training information 304 in FIG. 3, and not processed by application 302 of FIG. 3. Information 404 is in the same language as the language of training information 304, and pertains to the same domain as training information 304.

Application 402 receives style-intention rules 414 as input. Style-intention rules 414 comprise all or part of set 314 of style-intention rules in FIG. 3.

Application 402 receives encoded structure 418 as input. Encoded structure 418 comprises all or a part of encoded structure 318 in FIG. 3. For example, if encoded structure 318 was derived from a variety of training information, only some part of encoded structure may be relevant to information 404, and that part can be encoded structure 418.

Application 402 receives word-style associations 422 as another input. Word-style associations 422 comprises all or a part of word-style associations 322 in FIG. 3.

Component 432 parse information 404 to identify a set of one or more complete grammatical constructs in the language of information 404, such as sentences in the English language. In a subset of the cfcs, using word-style associations 422, component 434 identifies one or more styles that are used in the subset of cfcs.

Using encoded structure 418, component 436 assigns weights to the identified one or more styles. Component 438 selects all or some of the weighted styles as described earlier. Component 438 maps the selected weighted styles to their corresponding intentions using one or more rules from style-intention rules 414.

For a complete grammatical construct in the subset analyzed in this manner, component 440 selects one or more intentions according to a weighting associated with the mapped intentions. Component 440 tags the complete grammatical construct with the selected intentions. For example, component 440 constructs metadata for the complete grammatical construct using information describing a selected intention.

Application 402 repeats this operation of components 432-440 for as many complete grammatical constructs as may have to be tagged with intentions in this manner and outputs tagged information 442. For example, only some complete grammatical constructs in information 404 may have to be tagged in this manner.

Figure 5:
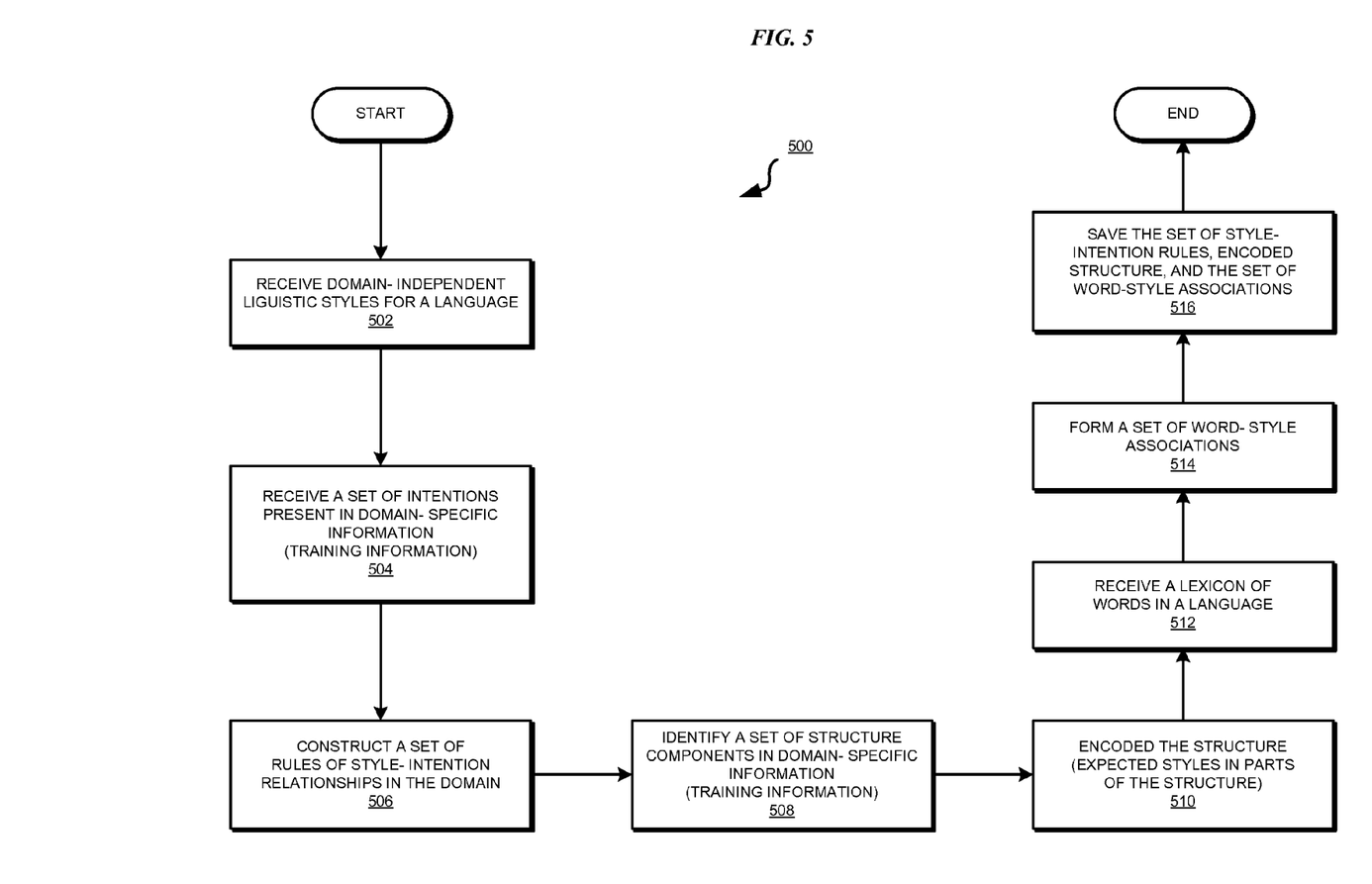
FIG. 5 depicts a flowchart of an example process for preparing for intention detection in domain-specific information in accordance with an illustrative embodiment.

With reference to FIG. 5, this figure depicts a flowchart of an example process for preparing for intention detection in domain-specific information in accordance with an illustrative embodiment. Process 500 can be implemented in application 302 in FIG. 3.

The application receives domain-independent linguistic styles for a given language (block 502). The application receives a set of intentions present in domain-specific information, e.g., domain-specific training information (block 504).

The application constructs a set of style-intention rules by encoding the relationships between the linguistic styles and the domain-related intentions into executable rules (block 506). A style-intention rule when executed on a given style outputs corresponding one or more intentions.

The application identifies a set of structure components in domain-specific information, such as domain-specific training information (block 508). A component of a structure is a part or a section of the organization of a given domain-specific information, where each part corresponds to one or more linguistic styles expected in that part. The application encodes the structure such that all or a portion of the structure is usable to weight the styles identified in new information pertaining to the same domain (block 510).

The application receives a lexicon of words in the given language (block 512). The application forms a set of word-style associations according to the usage in the given language (block 514).

The application saves the set of style-intention rules, the encoded structure, and the set of word-style associations (block 516). The application ends process 500 thereafter.

Figure 6:
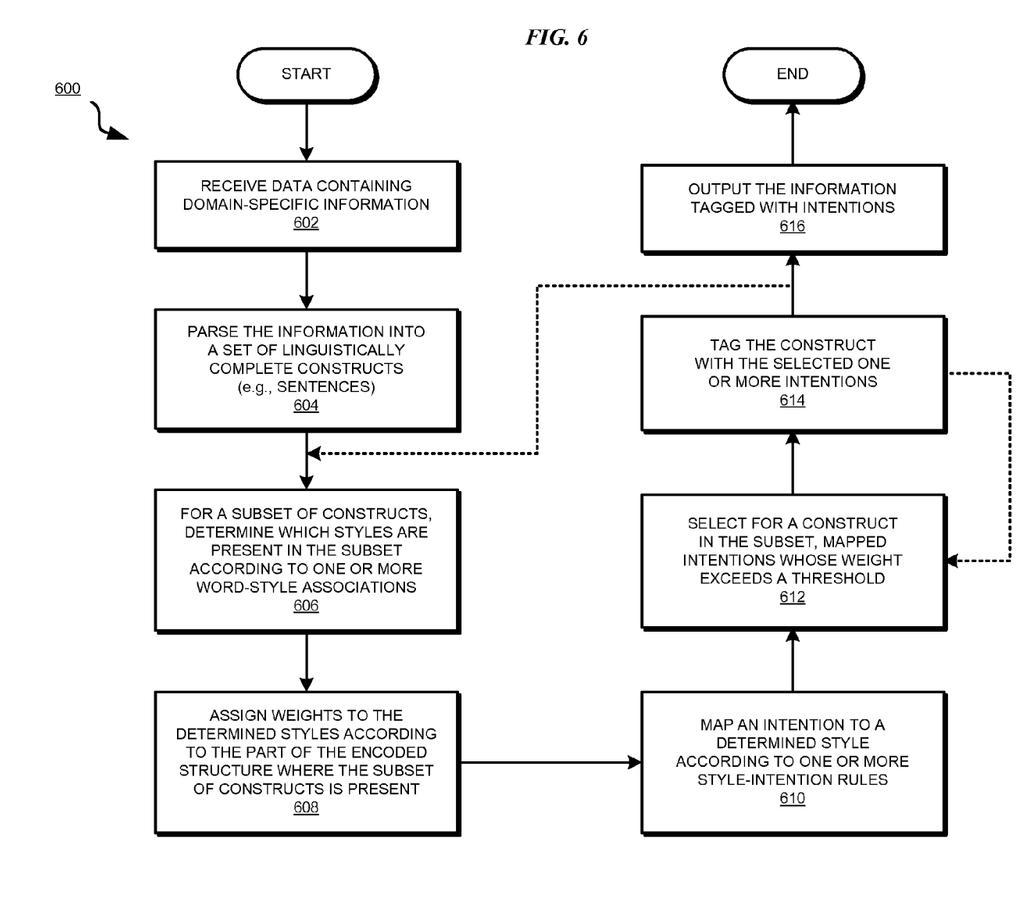
FIG. 6 depicts a flowchart of an example process for intention detection in domain-specific information in accordance with an illustrative embodiment.

With reference to FIG. 6, this figure depicts a flowchart of an example process for intention detection in domain-specific information in accordance with an illustrative embodiment. Process 600 can be implemented in application 402 in FIG. 4.

The application receives new information that pertains to the same domain as the training information of process 500 in FIG. 5 (block 602). The application parses the information into a set of complete grammatical constructs (block 604).

For a subset of the complete grammatical constructs, the application determines the styles that are present in the subset according to one or more word-style associations saved from process 500 in FIG. 5 (block 606). The application assigns weights to the determined styles according to the part of the encoded structure where the subset is present (block 608). The application maps an intention to a determined style according to one or more style-intention rules (block 610).

For a complete grammatical construct in the subset, the application selects a mapped intention whose weight exceeds an intention weight threshold (block 612). The application tags the complete grammatical construct with the selected one or more intentions (block 614). The application repeats block 612 and 614 for as many complete grammatical constructs as may be present in the subset. Furthermore, the application returns to block 606 to select another subset of complete grammatical constructs and repeat the operations described in blocks 606-614. Additionally, the repetition of blocks 606-614 and blocks 612-614 can be limited to only some complete grammatical constructs in the new information, if not all complete grammatical constructs of the new information are to be associated with intention information in this manner.

The application outputs the new information where some or all of the complete grammatical constructs in the new information are tagged (block 616). The application ends process 600 thereafter.

Thus, a computer implemented method, system or apparatus, and computer program product are provided in the illustrative embodiments for intention detection in domain-specific information. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for intention detection in information, the method comprising:

parsing, using a processor and a memory, a new information into a constituent set of complete grammatical constructs, the new information being in a language and relating to a subject matter domain;

identifying, in a subset of the complete grammatical constructs, a set of linguistic styles of the language according to a subset of a set of word-style associations related to the language and independent of the subject matter domain;

assigning a first weight to a first linguistic style and a second weight to a second linguistic style, the set of linguistic styles including the first linguistic style and the second linguistic style;

constructing, using second set of linguistic styles of the language, and using a taxonomy of intentions present in a training information relating to the subject matter domain, a set of style-intention rules, the set of style-intention rules including the style-intention rule, the style-intention rule relating a selected intention from the taxonomy of intentions with a selected linguistic style in the set of linguistic styles to indicate that the selected intention is present where the selected linguistic style appears in any information related to the subject matter domain;

mapping a first intention information to the first style using a first style-intention rule, and a second intention information to the second style using a second style-intention rule; and tagging a complete grammatical construct in the subset with the first intention information responsive to a weight associated with the first intention information exceeding an intention selection threshold.

2. The method of claim 1, further comprising: determining, using an encoded structure, that the subset of complete grammatical constructs is related to a section of the encoded structure, wherein the new information conforms to the encoded structure; determining, using the encoded structure, a second set of linguistic styles corresponding to the section of the encoded structure; concluding that the first linguistic style and the second linguistic style are also members of the second set of linguistic styles, wherein the assigning the first second and third weights is responsive to the concluding.

3. The method of claim 2, further comprising: evaluating, using the encoded structure, that the first linguistic style is more likely to be present in the section than the second linguistic style, wherein the first weight is greater than the second weight responsive to the evaluating.

4. The method of claim 1, further comprising: assigning a third weight to a third linguistic style, the set of linguistic styles including the third linguistic style; and omitting the third linguistic style from the mapping responsive to the third weight being below a style selection threshold.

5. The method of claim 1, further comprising: constructing, using a training information, a structure, wherein the training information conforms to the structure; encoding the structure, to form the encoded structure, by associating a third linguistic style that is present in a portion of the training information with a section of the structure; and assigning a third weight to the third linguistic style in the section.

6. The method of claim 1, further comprising: constructing, using a lexicon of the language, the set of word-style associations, wherein a word in a word-style association is used in the language to convey the corresponding style in the word-style association.

7. The method of claim 1, further comprising: adjusting, according to a third style-intention rule, the first weight to a third weight, wherein the first intention information is associated with the third weight.

8. The method of claim 1, further comprising: omitting tagging the complete grammatical construct in the subset with the second intention information responsive to a weight associated with the second intention information not exceeding the intention selection threshold.

9. The method of claim 1, wherein the language is English, and a complete grammatical construct in the set of complete grammatical constructs is a sentence according to English grammar.

10. A computer usable program product comprising a computer readable storage device including computer usable code for intention detection in information,
    the computer usable code comprising:
    computer usable code for parsing a new information into a constituent set of complete grammatical constructs, the new information being in a language and relating to a subject matter domain;
    computer usable code for identifying, in a subset of the complete grammatical constructs, a set of linguistic styles of the language according to a subset of a set of word-style associations related to the language and independent of the subject matter domain;
    computer usable code for assigning a first weight to a first linguistic style and a second weight to a second linguistic style, the set of linguistic styles including the first linguistic style and the second linguistic style;
    computer usable code for constructing, using second set of linguistic styles of the language, and using a taxonomy of intentions present in a training information relating to the subject matter domain, a set of style-intention rules, the set of style-intention rules including the style-intention rule, the style-intention rule relating a selected intention from the taxonomy of intentions with a selected linguistic style in the set of linguistic styles to indicate that the selected intention is present where the selected linguistic style appears in any information related to the subject matter domain;
    computer usable code for mapping a first intention information to the first style using a first style-intention rule, and a second intention information to the second style using a second style-intention rule;
    and computer usable code for tagging a complete grammatical construct in the subset with the first intention information responsive to a weight associated with the first intention information exceeding an intention selection threshold.

11. The computer usable program product of claim 10, further comprising: computer usable code for determining, using an encoded structure, that the subset of complete grammatical constructs is related to a section of the encoded structure, wherein the new information conforms to the encoded structure; computer usable code for determining, using the encoded structure, a second set of linguistic styles corresponding to the section of the encoded structure; computer usable code for concluding that the first linguistic style and the second linguistic style are also members of the second set of linguistic styles, wherein the assigning the first second and third weights is responsive to the concluding.

12. The computer usable program product of claim 11, further comprising: computer usable code for evaluating, using the encoded structure, that the first linguistic style is more likely to be present in the section than the second linguistic style, wherein the first weight is greater than the second weight responsive to the evaluating.

13. The computer usable program product of claim 10, further comprising: computer usable code for assigning a third weight to a third linguistic style, the set of linguistic styles including the third linguistic style; and computer usable code for omitting the third linguistic style from the mapping responsive to the third weight being below a style selection threshold.

14. The computer usable program product of claim 10, further comprising:
    computer usable code for constructing, using second set of linguistic styles of the language, and using a taxonomy of intentions present in a training information relating to the subject matter domain, a set of style-intention rules, the set of style-intention rules including the style-intention rule, the style-intention rule relating a selected intention from the taxonomy of intentions with a selected linguistic style in the set of linguistic styles to indicate that the selected intention is present where the selected linguistic style appears in any information related to the subject matter domain.

15. The computer usable program product of claim 10, further comprising: computer usable code for constructing, using a training information, a structure, wherein the training information conforms to the structure; computer usable code for encoding the structure, to form the encoded structure, by associating a third linguistic style that is present in a portion of the training information with a section of the structure; and computer usable code for assigning a third weight to the third linguistic style in the section.

16. The computer usable program product of claim 10, further comprising: computer usable code for constructing, using a lexicon of the language, the set of word-style associations, wherein a word in a word-style association is used in the language to convey the corresponding style in the word-style association.

17. The computer usable program product of claim 10, wherein the computer usable code is stored in a computer readable storage device in a data processing system, and wherein the computer usable code is transferred over a network from a remote data processing system.

18. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

19. A data processing system for intention detection in information,
    the data processing system comprising:
    a storage device, wherein the storage device stores computer usable program code;
    and a processor, wherein the processor executes the computer usable program code, and wherein the computer usable program code comprises:

computer usable code for parsing a new information into a constituent set of complete grammatical constructs, the new information being in a language and relating to a subject matter domain;

computer usable code for identifying, in a subset of the complete grammatical constructs, a set of linguistic styles of the language according to a subset of a set of word-style associations related to the language and independent of the subject matter domain;

computer usable code for assigning a first weight to a first linguistic style and a second weight to a second linguistic style, the set of linguistic styles including the first linguistic style and the second linguistic style;

computer usable code for constructing, using second set of linguistic styles of the language, and using a taxonomy of intentions present in a training information relating to the subject matter domain, a set of style-intention rules, the set of style-intention rules including the style-intention rule, the style-intention rule relating a selected intention from the taxonomy of intentions with a selected linguistic style in the set of linguistic styles to indicate that the selected intention is present where the selected linguistic style appears in any information related to the subject matter domain;

computer usable code for mapping a first intention information to the first style using a first style-intention rule, and a second intention information to the second style using a second style-intention rule;

and computer usable code for tagging a complete grammatical construct in the subset with the first intention information responsive to a weight associated with the first intention information exceeding an intention selection threshold.

* * * * *